US010939510B2

(12) United States Patent
Lee et al.

(10) Patent No.: US 10,939,510 B2
(45) Date of Patent: Mar. 2, 2021

(54) STEAM GENERATOR FOR A MICROWAVE OVEN

(71) Applicant: Haier US Appliance Solutions, Inc., Wilmington, DE (US)

(72) Inventors: Byung Cheon Lee, Seongnam (KR); Hyuk-chul Kwon, Seongnam (KR)

(73) Assignee: Haier US Appliance Solutions, Inc., Wilmington, DE (US)

( * ) Notice: Subject to any disclaimer, the term of this patent is extended or adjusted under 35 U.S.C. 154(b) by 256 days.

(21) Appl. No.: 15/952,339

(22) Filed: Apr. 13, 2018

(65) Prior Publication Data

US 2019/0320505 A1 Oct. 17, 2019

(51) Int. Cl.

| | |
|---|---|
| ***H05B 6/64*** | (2006.01) |
| ***H05B 6/72*** | (2006.01) |
| ***A47J 27/04*** | (2006.01) |
| ***F22B 3/00*** | (2006.01) |

(52) U.S. Cl.

CPC ............. *H05B 6/6479* (2013.01); *F22B 3/00* (2013.01)

(58) Field of Classification Search

CPC ................................ F22B 3/00; H05B 6/6479

USPC ............... 219/738, 681, 682, 401, 746, 756; 99/DIG. 14, 451, 468, 403; 126/21 A, 126/20; 426/302

See application file for complete search history.

(56) References Cited

U.S. PATENT DOCUMENTS

| | | | | |
|---|---|---|---|---|
| 6,861,631 | B2 | 3/2005 | Hahm et al. | |
| 2014/0227411 | A1* | 8/2014 | Popeil | A47J 37/1209 426/302 |
| 2017/0246666 | A1 | 8/2017 | Au | |

FOREIGN PATENT DOCUMENTS

| | | | |
|---|---|---|---|
| CN | 105877670 | A | 8/2016 |
| CN | 206324636 | U | 7/2017 |
| EP | 2009959 | A2 | 12/2008 |
| ES | 2160059 | A1 * | 10/2001 |
| JP | 2004061091 | A * | 2/2004 |

* cited by examiner

*Primary Examiner* — Quang T Van

(74) *Attorney, Agent, or Firm* — Dority & Manning, P.A.

(57) ABSTRACT

A microwave oven includes a cabinet that defines a cooking chamber and a steam generator within the cooking chamber. The steam generator includes a disk-shaped main body with a water storage volume internal to the main body. The steam generator also includes a connector in operative communication with a motor of the microwave oven. The motor is operable to rotate the disk-shaped main body during a cooking operation of the microwave oven. The steam generator also includes a plurality of vents positioned above the water storage volume. The vents direct steam from the water storage volume into the cooking chamber of the microwave oven appliance during the cooking operation of the microwave oven appliance.

14 Claims, 7 Drawing Sheets

STEAM GENERATOR FOR A MICROWAVE OVEN

FIELD OF THE INVENTION

The present subject matter relates generally to microwave oven appliances, and more particularly to microwave oven appliances including features which generate steam to clean the microwave oven and/or steam cook food item therein.

BACKGROUND OF THE INVENTION

Microwave oven appliances generally include a cabinet that defines a cooking chamber for receipt of food items for cooking. In the course of such cooking operations, the food items may spill, splatter, and/or overflow within the cooking chamber. Moreover, such spills, etc., may quickly become baked on due to the high temperatures within the cooking chamber. Also, conventional microwave oven appliances generally provide only a single mode of operation, i.e., heating with microwave radiation, for cooking.

Some attempts have been made to provide steam generating features in a microwave oven appliance. However, such attempts typically include additional components, such as storage tanks, pumps, and associated piping for delivering liquid water and/or steam to the cooking chamber. Additionally, some devices for generating steam require a dedicated heating element just for heating liquid water to create steam, in addition to the heating element(s) used for cooking. Such additional components for storing, transporting, and/or heating liquid water to generate steam generally increase the overall size of the microwave appliance and/or reduce the available space for food items within the cooking chamber.

Accordingly, a steam generator for a microwave oven which is compact and which can generate steam during a cooking operation of the microwave oven appliance would be useful.

BRIEF DESCRIPTION OF THE INVENTION

Aspects and advantages of the invention will be set forth in part in the following description, may be apparent from the description, or may be learned through practice of the invention.

In one aspect of the present disclosure, a microwave oven is provided. The microwave oven includes a cabinet defining a cooking chamber. A steam generator is provided within the cooking chamber. The steam generator includes a disk-shaped main body having a hollow interior that defines a water storage volume. The steam generator also includes a connector in operative communication with a motor of the microwave oven. The motor is operable to rotate the disk-shaped main body during a cooking operation of the microwave oven. The steam generator also includes a plurality of vents positioned above the water storage volume along a vertical direction. The vents are configured to direct steam from the water storage volume into the cooking chamber of the microwave oven during the cooking operation of the microwave oven.

In another aspect of the present disclosure, a steam generator for a microwave oven appliance is provided. The steam generator includes a disk-shaped main body having a hollow interior that defines a water storage volume. The steam generator also includes a connector in operative communication with a motor of the microwave oven appliance. The motor is operable to rotate the disk-shaped main body during a cooking operation of the microwave oven appliance. The steam generator also includes a plurality of vents positioned above the water storage volume along a vertical direction. The vents are configured to direct steam from the water storage volume into a cooking chamber of the microwave oven appliance during the cooking operation of the microwave oven appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
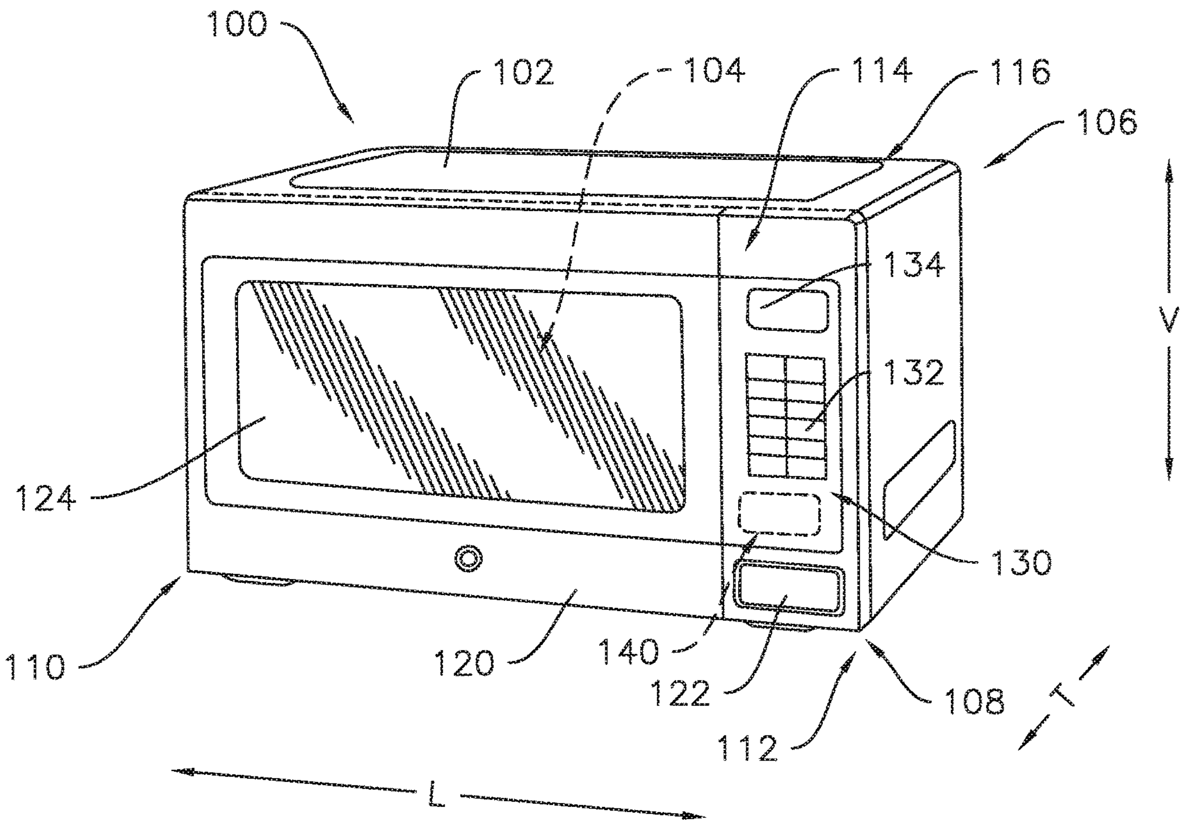
FIG. 1 provides a perspective view of a microwave oven appliance in accordance with an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

FIG. 1 provides a front, perspective view of a microwave oven 100 as may be employed with the present subject matter. Microwave oven 100 includes an insulated cabinet 102. Cabinet 102 defines a cooking chamber 104 for receipt of food items for cooking. As will be understood by those skilled in the art, microwave oven 100 is provided by way of example only, and the present subject matter may be used in any suitable microwave oven, such as a countertop microwave oven, an over-the-range microwave oven, etc. Thus, the example embodiment shown in FIG. 1 is not intended to limit the present subject matter to any particular configuration or arrangement.

As illustrated, microwave oven 100 generally defines a vertical direction V, a lateral direction L, and a transverse direction T, each of which is mutually perpendicular, such that an orthogonal coordinate system is generally defined. Cabinet 102 of microwave oven 100 extends between a top 106 and a bottom 108 along the vertical direction V, between a first side 110 (left side when viewed from front) and a second side 112 (right side when viewed from front) along the lateral direction L, and between a front 114 and a rear 116 along the transverse direction T.

Microwave oven 100 includes a door 120 that is rotatably attached to cabinet 102 in order to permit selective access to cooking chamber 104. A handle may be mounted to door 120 to assist a user with opening and closing door 120 in order to access cooking chamber 104. As an example, a user can pull on the handle mounted to door 120 to open or close door 120 and access cooking chamber 104. Alternatively, microwave oven 100 may include a door release button 122 that disengages or otherwise pushes open door 120 when depressed. Glass window panes 124 provide for viewing the contents of cooking chamber 104 when door 120 is closed and also assist with insulating cooking chamber 104.

Microwave oven 100 is generally configured to heat articles, e.g., food or beverages, within cooking chamber 104 using electromagnetic radiation. Microwave appliance 100 may include various components which operate to produce the electromagnetic radiation, as is generally understood. For example, microwave appliance 100 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber.

The structure and intended function of microwave ovens are generally understood by those of ordinary skill in the art and are not described in further detail herein. According to alternative embodiments, microwave oven may include one or more heating elements, such as electric resistance heating elements, gas burners, other microwave heating elements, halogen heating elements, or suitable combinations thereof, are positioned within cooking chamber 104 for heating cooking chamber 104 and food items positioned therein.

Referring again to FIG. 1, a user interface panel 130 and a user input device 132 may be positioned on an exterior of the cabinet 102. The user interface panel 130 may represent a general purpose Input/Output ("GPIO") device or functional block. In some embodiments, the user interface panel 130 may include or be in operative communication with user input device 132, such as one or more of a variety of digital, analog, electrical, mechanical or electro-mechanical input devices including rotary dials, control knobs, push buttons, and touch pads. The user input device 132 is generally positioned proximate to the user interface panel 130, and in some embodiments, the user input device 132 may be positioned on the user interface panel 130. The user interface panel 130 may include a display component 134, such as a digital or analog display device designed to provide operational feedback to a user.

Generally, microwave oven 100 may include a controller 140 in operative communication with the user input device 132. The user interface panel 130 of the microwave oven 100 may be in communication with the controller 140 via, for example, one or more signal lines or shared communication busses, and signals generated in controller 140 operate microwave oven 100 in response to user input via the user input devices 132. Input/Output ("I/O") signals may be routed between controller 140 and various operational components of microwave oven 100. Operation of microwave oven 100 can be regulated by the controller 140 that is operatively coupled to the user interface panel 130.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of microwave oven 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, a controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
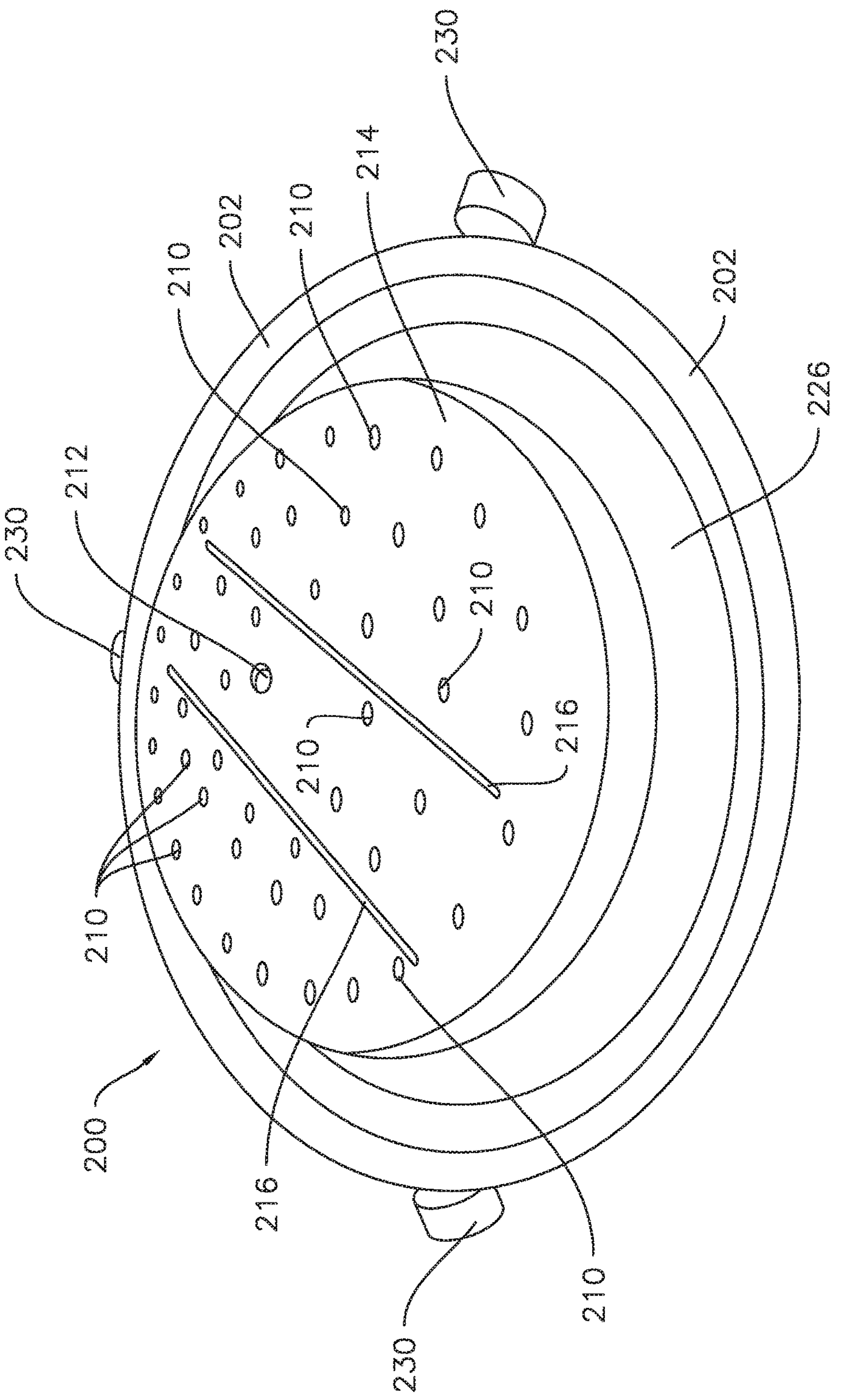
FIG. 2 provides a top perspective view of a steam generator according to one or more embodiments of the present subject matter which may be used with a microwave oven appliance such as the exemplary microwave oven appliance of FIG. 1.
Figure 5:
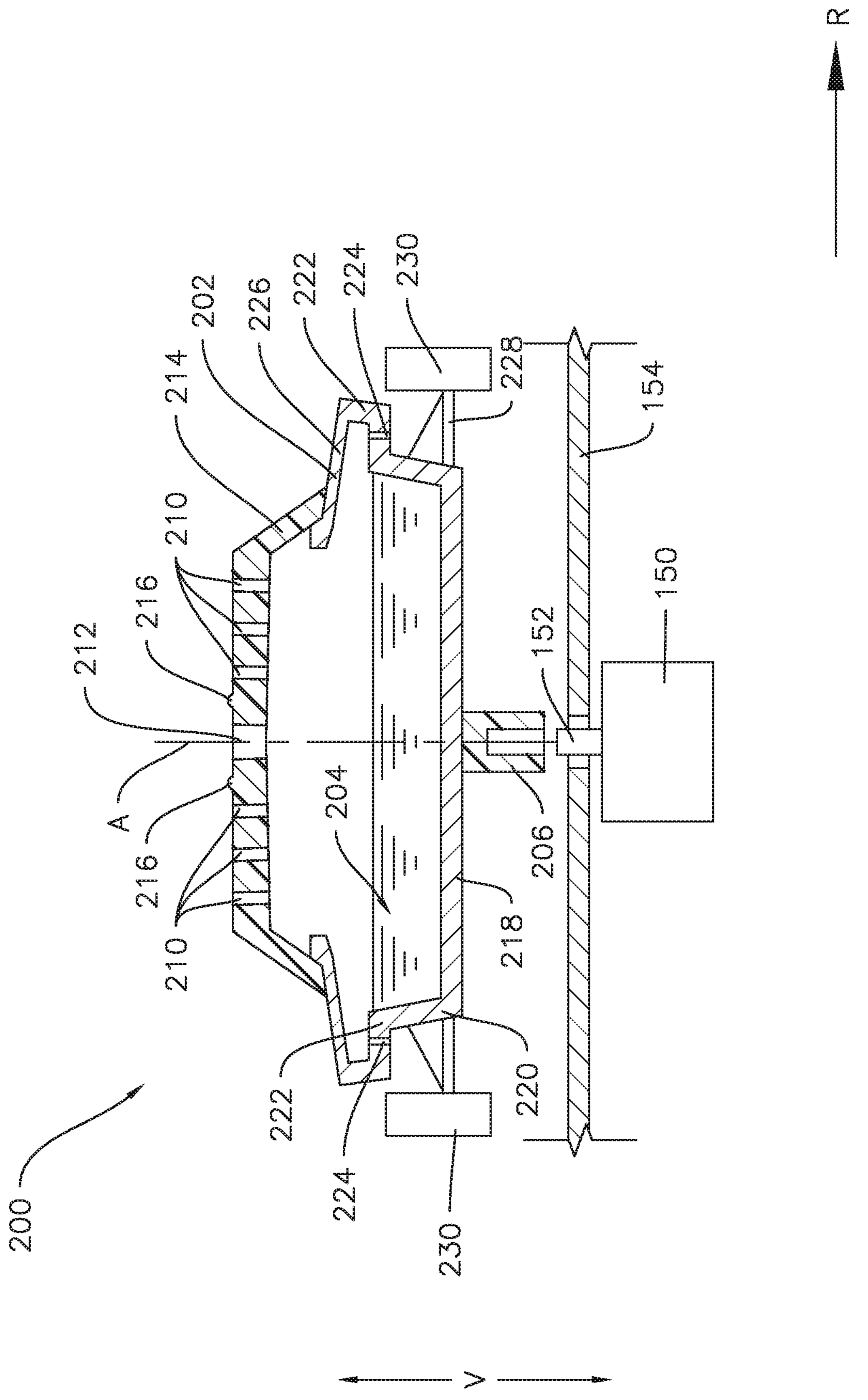
FIG. 5 provides a section view of the steam generator of FIG. 2.

FIG. 2 provides a perspective view of an exemplary steam generator 200 as may be used with microwave oven appliances such as microwave oven 100. FIG. 2 generally illustrates a top portion of the steam generator 200. As may be seen in FIG. 2, the steam generator 200 includes a main body portion 202 and a cap 214. The main body 202 may be disk-shaped, e.g., the main body 202 may generally form a shallow cylinder with a diameter much greater than a height of the cylinder. The cap 214 may fit over the main body 202. The steam generator 200 may include a plurality of vents 210 configured to direct steam into the cooking chamber 104. For example, the plurality of vents 210 may be formed in the cap 214, as shown in FIG. 2. The main body 202 includes a hollow interior and the cap 214 includes a fill hole 212 in fluid communication with the interior of the main body 202. The hollow interior of the main body 202 defines a water storage volume 204 (FIG. 5). Liquid water can be poured into the main body 202 through the fill hole 212. Reference is made herein to water by way of example only, it will be understood that other liquids may be stored in the water storage volume 204 as well as or instead of liquid water. For example, detergents or perfumes may be added. Moreover, such additives may be provided in a powder or gel form and mixed with liquid water and/or other liquid(s) in the water storage volume 204. It is also contemplated within the scope of the present subject matter that additives, e.g., table salt, may be included which alter the boiling point of the water or other liquid in the water storage volume 104.

When the main body 202, and in particular the water storage volume 204 thereof, is filled with liquid water and placed in the microwave oven 100, steam can be generated by the steam generator 200 during a cooking operation of the microwave oven 100. In particular, no special operating mode is required, e.g., the same operational components, e.g., the magnetron as described above, and the same operational parameters, e.g., power and time, as would be used to prepare a food item may also or instead be used to generate steam within the cooking chamber 104 from the steam generator 200. For example, such steam may be useful to steam clean the cooking chamber or to steam cook food items. In some embodiments, no additional heating elements are required or provided in the microwave oven 100 to heat water in the steam generator 200. Also, the steam generator 200 may include a self-contained water supply whereby no water supply external of the main body 202 may be required or included in the microwave oven 100.

Figure 3:
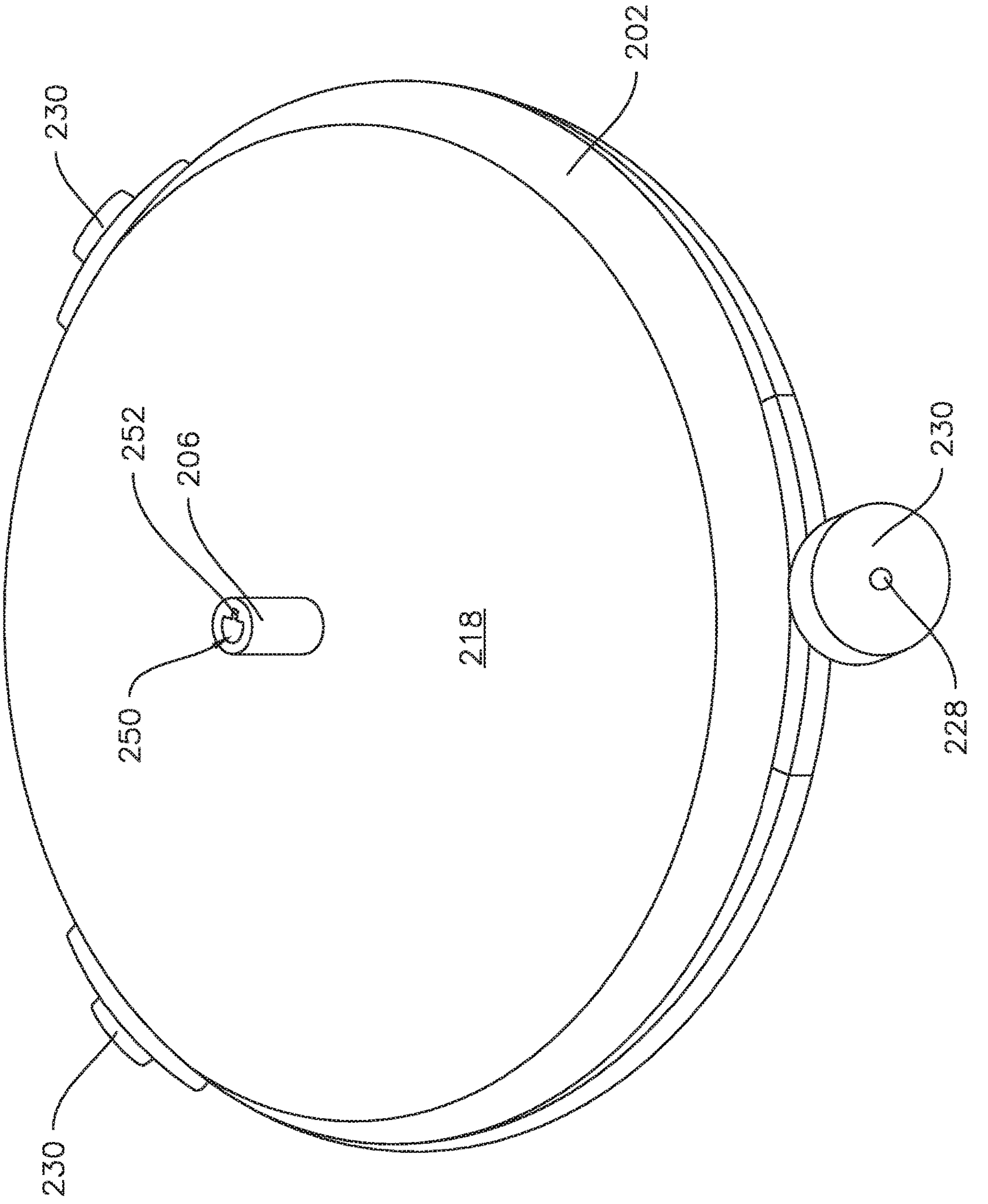
FIG. 3 provides a bottom perspective view of the exemplary steam generator of FIG. 2.

The steam generator 200 may be configured to rotate within the microwave oven 100. For example, the steam generator 200 may include a plurality of wheels 230 at or near an outer perimeter of the steam generator 200, as illustrated for example in FIGS. 2 and 3. The steam generator 200 may include a connector for connecting to the microwave oven 100, e.g., the connector may be in operative communication with a motor 150 (FIG. 5) of the microwave oven 100 such that the motor 150 operates to rotate the steam generator 200 during a cooking operation of the microwave oven 100. In some embodiments, for example as illustrated in FIG. 3, the connector may be a spindle 206 configured to engage a drive shaft 152 (FIG. 5) of the motor 150. The spindle 206 may be connected to a base wall 218 of the main body 202, e.g., at a first end of the spindle 206. A second end of the spindle 206 may include an opening 250 configured to receive the drive shaft 152. For example, the drive shaft 152 may have a key (not shown) formed thereon, and the opening 250 of the spindle 206 may include a slot 252 that receives the key such that the drive shaft 152 may rotatably engage the spindle 206.

Figure 4:
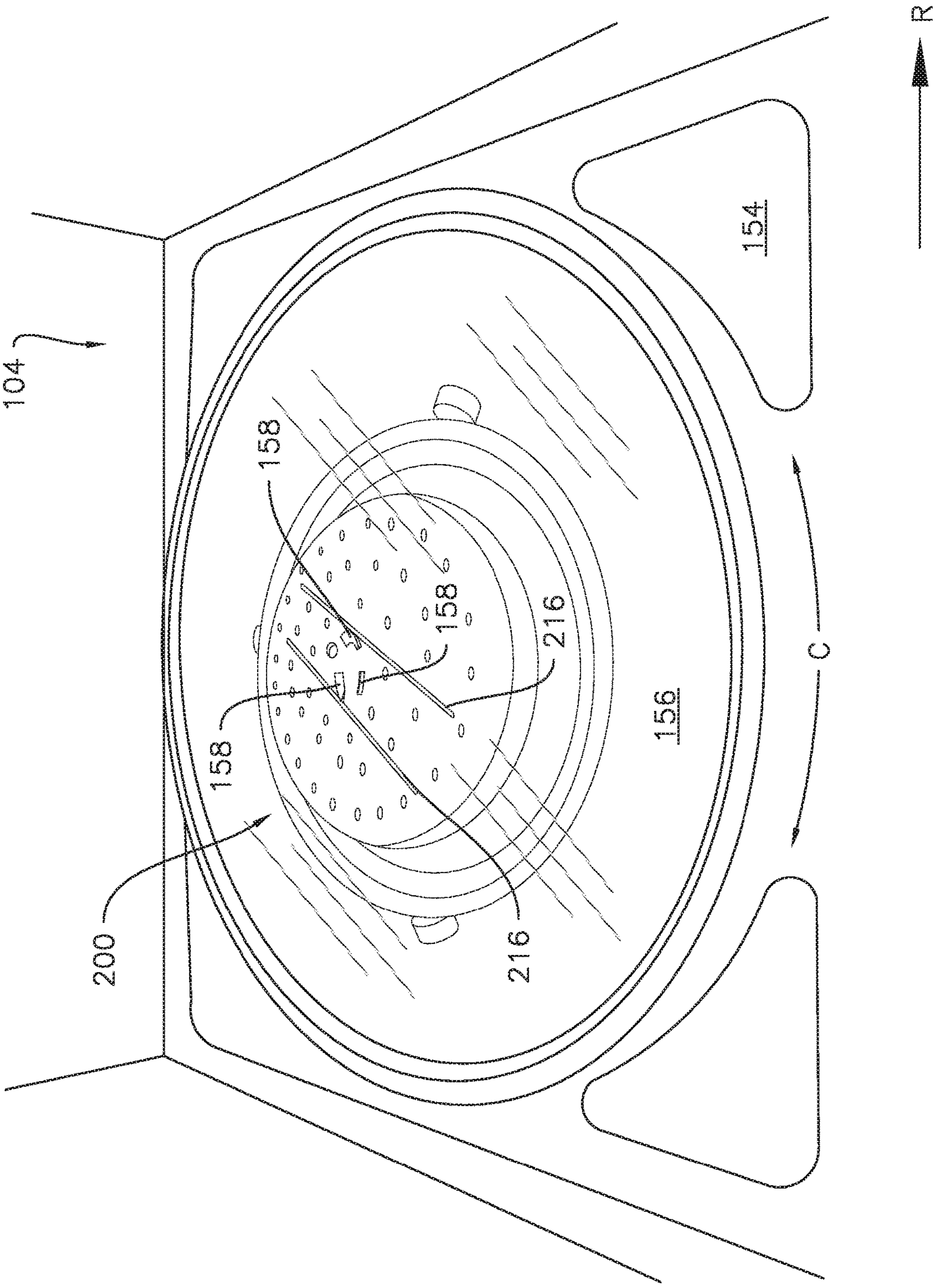
FIG. 4 provides a perspective view of the exemplary steam generator of FIG. 2 in an installed position with a tray.

Referring now to FIG. 4, the steam generator 200 may be installed in the microwave oven 100 with little or no reduction in the available volume within the cooking chamber 104 for food items. For example, the steam generator 200 may fit in a recess in a floor 154 of the cooking chamber 104 to rotatably support a cooking tray 156. The cooking tray 156 may be configured to receive one or more food items thereon, as will be understood by those of ordinary skill in the art. The steam generator 200 may include a pair of ribs 216, e.g., formed in the cap 214, which are configured to engage the cooking tray 156 of the microwave oven appliance 100. For example, the ribs 216 may engage one or more protrusions 158 formed on a bottom surface of the cooking tray 156, as shown in FIG. 4. When so engaged, rotation of the steam generator 200, e.g., by the motor 150, will also cause the tray 156 to rotate with it, e.g., along the circumferential direction C. Thus, one of ordinary skill in the art will appreciate that the steam generator 200 may be used with many existing microwaves in the place of a conventional rotating ring which supports the cooking tray 156 and transfers rotation to the cooking tray 156, and may do so without impinging on the usable volume of the cooking chamber 104. Accordingly, steam generator 200 may be used to steam cook food items on the cooking tray 156 during a cooking operation of the microwave oven 100.

FIG. 5 provides a section view of an exemplary steam generator 200 and a portion of the microwave oven 100. As shown in FIG. 5, the steam generator 200 is configured to engage the motor 150 of the microwave oven 100. The steam generator 200 may define a central axis A which is oriented along the vertical direction V when the steam generator 200 is installed in the microwave oven 100. In such embodiments, the steam generator 200 may be rotatable by the motor 150 about the vertical direction V, e.g., along circumferential direction C (FIG. 4) which extends around the central axis A. Also as shown in FIGS. 4 and 5, the steam generator 200 may also define a radial direction R perpendicular to the central axis A and, in some embodiments, the radial direction R may also be perpendicular to the vertical direction V, e.g., when the steam generator 200 is installed in the microwave oven 100.

Figure 6:
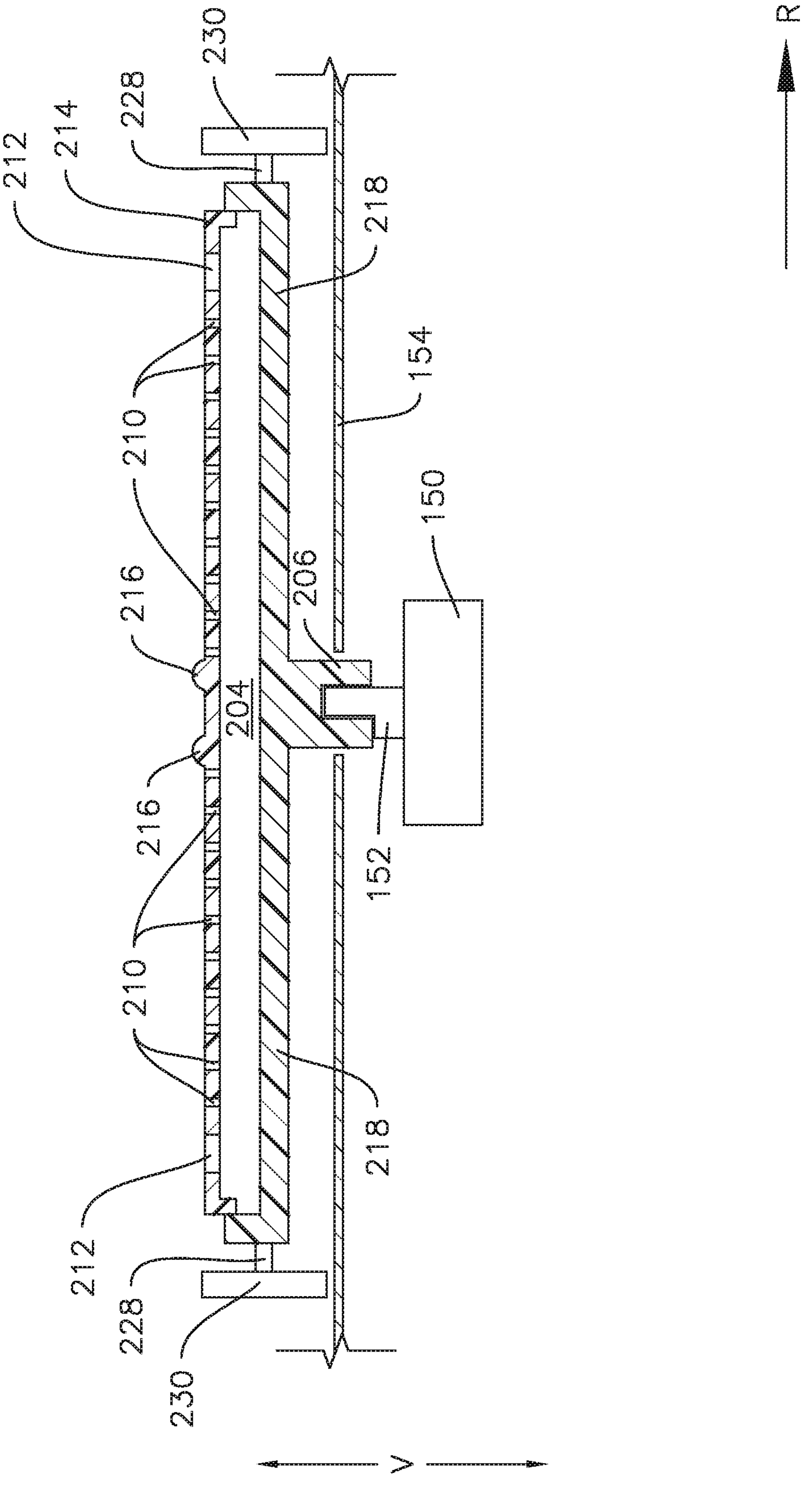
FIG. 6 provides a section view of the steam generator of FIG. 2 in an installed position.
Figure 7:
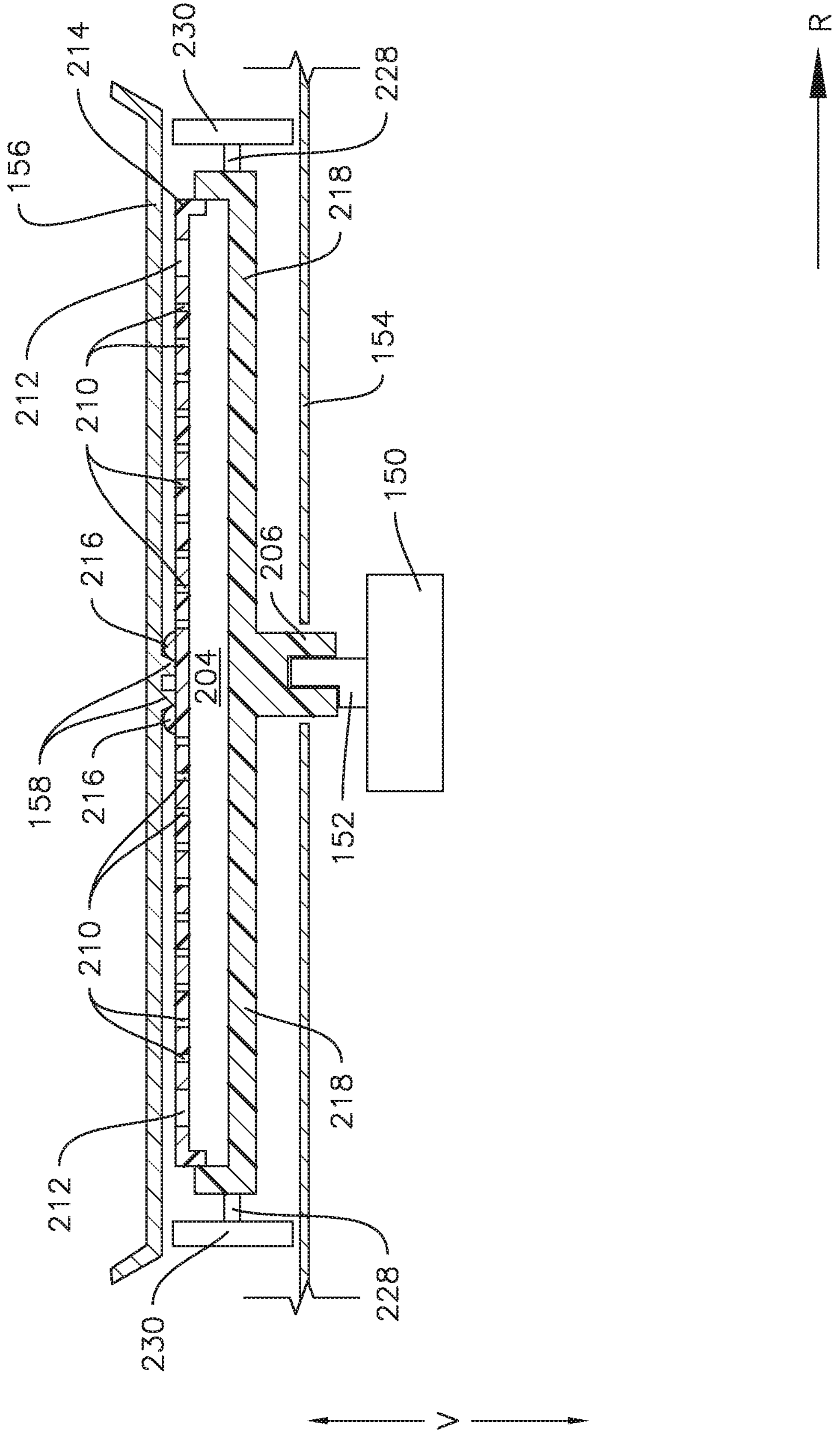
FIG. 7 provides a section view of the steam generator of FIG. 2 in an installed position with a tray disposed thereon.

FIG. 6 provides a section view of an exemplary steam generator 200 in the installed position in the microwave oven 100. FIG. 7 provides a section view of an exemplary steam generator 200 in the installed position in the microwave oven 100 with a cooking tray 156 supported thereon, as described in more detail above with respect to FIG. 4. The steam generator 200 may be installed in or removed from the microwave oven 100 vertically, e.g., by moving the steam generator 200 along the vertical direction V between the position shown in FIG. 5 and the installed position shown in FIG. 6. As illustrated in FIG. 6, the steam generator 200 may be used, e.g., for steam cleaning the microwave oven 100, in particular the cooking chamber 104 thereof. As illustrated in FIG. 7, when paired with the cooking tray 156, the steam generator 200 may be used, e.g., for steam cooking food items (not shown) on the cooking tray 156.

As shown in FIGS. 5 through 7, the motor 150 of the microwave oven 100 may be positioned below the floor 154 of the cooking chamber 104. The drive shaft 152 may extend through the floor 154, e.g., upward along the vertical direction V, as shown in FIG. 5. Accordingly, the spindle 206 may extend through the floor 154 when the steam generator 200 is installed in the microwave oven 100. Thus, the main body 202, and in particular the base wall 218 thereof, will be positioned in close proximity to the floor 154, whereby intrusion of the steam generator 200 into the usable space of cooking chamber 104 for receiving food items is avoided or minimized.

The main body 202 may comprise a plurality of walls which define the hollow interior of the main body 202. For example, the main body 202 may include the base wall 218, as mentioned above, as well as a side wall 220 connected to and extending upwardly along the vertical direction V from a perimeter of the base wall 218. The water storage volume 204 may be defined between the base wall 218 and the side wall 220. A vertical dimension, e.g., depth, of the water storage volume 204 may be defined by the side wall 220. For example, an annular rim 222 may extend radially outward, e.g., along the radial direction R away from central axis A, from the side wall 220. In particular, the annular rim 222 may extend radially outward from a top of the side wall 220, as illustrated for example in FIG. 5. A drain hole 224 may be formed in the annular rim 222. Thus, when water overtops the side wall 220, the water will flow over the annular rim 222 and out the drain hole 224, thereby avoiding overfilling the water storage volume 204.

As shown in FIGS. 5 through 7, the cap 214 is positioned above the main body 202 along the vertical direction V. For example, the cap 214 may fit on and/or over a top wall 226 of the main body 202. As such, the fill hole 212 of the cap 214 may be in fluid communication with the water storage volume 204 such that water poured through the fill hole 212 of the cap 214 may flow by gravity into the water storage volume 204. Also, the plurality of vents 210 in the cap 214 will be positioned above the water storage volume 204 along the vertical direction V. Thus, during a cooking operation of the microwave oven 100, water in the water storage volume 204 may heat up and boil, turning the liquid water into steam. The plurality of vents 210 may be configured to direct such steam from the water storage volume 204 into the cooking chamber 104 of the microwave oven 100 during the cooking operation of the microwave oven 100.

As mentioned above, the steam generator 200 may rotate during the cooking operation of the microwave oven 100 and may include a plurality of wheels 230 connected to the main body 202 to provide or enhance rotation of the steam generator 200 within the microwave oven 100. As seen in FIGS. 5 through 7, the wheels 230 may be positioned radially outward of the annular rim 222. For example, each wheel of the plurality of wheels 230 may be connected to the side wall 220 by a respective axle 228. The axles 228 may be sized and configured to position the wheels 230 outboard of the main body 202, whereby an overall vertical dimension of the steam generator 200 may be minimized, e.g., where the wheels 230 may be aligned with the side wall 220 along the vertical direction V, as shown in FIG. 5, as opposed to the wheels 230 extending mostly or entirely below the main body 202.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A microwave oven comprising:

a cabinet defining a cooking chamber; and a steam generator within the cooking chamber, the steam generator defining an axial direction parallel to a central axis of the steam generator and a radial direction perpendicular to the axial direction, the steam generator comprising:

a disk-shaped main body comprising a base wall and a side wall, the base wall and the side wall defining a hollow interior therebetween that defines a water storage volume;

a connector directly connected to the base wall of the disk-shaped main body, the connector in operative communication with a motor of the microwave oven, the motor operable to rotate the disk-shaped main body during a cooking operation of the microwave oven;

a plurality of axles directly connected to the side wall of the main body, the plurality of axles extending generally along the radial direction from the side wall of the main body;

a plurality of wheels, each wheel of the plurality of wheels connected to a respective one of the plurality of axles, the wheels aligned with the side wall of the main body along the axial direction;

a cap positioned over the disk-shaped main body and in direct contact with the disk-shaped main body;

a plurality of vents formed in the cap, the plurality of vents positioned above the water storage volume along a vertical direction, the vents configured to direct steam from the water storage volume into the cooking chamber of the microwave oven during the cooking operation of the microwave oven; and a plurality of ribs formed in the cap and configured to engage a cooking tray.

2. The microwave oven of claim 1, further comprising a fill hole in fluid communication with the water storage volume of the steam generator.

3. The microwave oven of claim 1, wherein the connector of the steam generator is a spindle configured to engage a drive shaft of the motor.

4. The microwave oven of claim 1, further comprising an annular rim extending radially outward from the side wall.

5. The microwave oven of claim 4, further comprising a drain hole in the annular rim.

6. The microwave oven of claim 4, wherein the plurality of wheels connected to the main body of the steam generator are positioned radially outward of the annular rim.

7. The microwave oven of claim 1, wherein the steam generator does not include a water supply external of the main body.

8. A steam generator for a microwave oven appliance, the steam generator defining an axial direction parallel to a central axis of the steam generator and a radial direction perpendicular to the axial direction, the steam generator comprising:

a disk-shaped main body comprising a base wall and a side wall, the base wall and the side wall defining a hollow interior therebetween that defines a water storage volume;

a connector directly connected to the base wall of the disk-shaped main body, the connector in operative communication with a motor of the microwave oven appliance, the motor operable to rotate the disk-shaped main body during a cooking operation of the microwave oven appliance;

a plurality of axles directly connected to the side wall of the main body, the plurality of axles extending generally along the radial direction from the side wall of the main body;

a plurality of wheels, each wheel of the plurality of wheels connected to a respective one of the plurality of axles, the wheels aligned with the side wall of the main body along the axial direction;

a cap positioned over the disk-shaped main body and in direct contact with the disk-shaped main body;

a plurality of vents formed in the cap, the plurality of vents positioned above the water storage volume along a vertical direction, the vents configured to direct steam from the water storage volume into a cooking chamber of the microwave oven appliance during the cooking operation of the microwave oven appliance; and a plurality of ribs formed in the cap and configured to engage a cooking tray of the microwave oven appliance.

9. The steam generator of claim 8, further comprising a fill hole in fluid communication with the water storage volume.

10. The steam generator of claim 8, wherein the connector is a spindle configured to engage a drive shaft of the motor.

11. The steam generator of claim 8, further comprising an annular rim extending radially outward from the side wall.

12. The steam generator of claim 11, further comprising a drain hole in the annular rim.

13. The steam generator of claim 11, wherein the plurality of wheels connected to the main body are positioned radially outward of the annular rim.

14. The steam generator of claim 8, wherein the steam generator does not include a water supply external of the main body.

* * * * *